(12) United States Patent
Berhalter et al.

(10) Patent No.: US 9,243,082 B2
(45) Date of Patent: Jan. 26, 2016

(54) PROCESS FOR POLYMERIZING OR COPOLYMERIZING ETHYLENICALLY UNSATURATED MONOMERS IN THE PRESENCE OF FREE-RADICAL POLYMERIZATION INITIATORS

(71) Applicant: Basell Polyolefine GmbH, Wesseling (DE)

(72) Inventors: Klaus Berhalter, Bornheim-Dersdorf (DE); Andrei Gonioukh, Erftstadt (DE); Thomas Herrmann, Darmstadt (DE); David Finotto, Aix en Provence (FR); Gilles Rieu, Saint Chamas (FR); Laurent Hautier, Puyricard (FR); Christoph Treis, Troisdorf (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/355,512

(22) PCT Filed: Nov. 1, 2012

(86) PCT No.: PCT/EP2012/071644
§ 371 (c)(1),
(2) Date: Apr. 30, 2014

(87) PCT Pub. No.: WO2013/064586
PCT Pub. Date: May 10, 2013

(65) Prior Publication Data
US 2014/0288248 A1 Sep. 25, 2014

Related U.S. Application Data

(60) Provisional application No. 61/556,639, filed on Nov. 7, 2011.

(30) Foreign Application Priority Data

Nov. 3, 2012 (EP) .................................... 11187690

(51) Int. Cl.
*C08F 2/00* (2006.01)
*C08F 2/34* (2006.01)
(Continued)

(52) U.S. Cl.
CPC ...... *C08F 4/34* (2013.01); *C08F 4/04* (2013.01); *C08F 10/00* (2013.01); *Y02P 30/48* (2015.11)

(58) Field of Classification Search
CPC .............. C08F 2/005; C08F 4/04; C08F 4/34; C08F 10/02
USPC ..................................................... 526/64, 235
See application file for complete search history.

(56) References Cited

U.S. PATENT DOCUMENTS 3,809,688 A * 5/1974 Clementi et al. .............. 528/501
4,803,251 A 2/1989 Goode
(Continued)

FOREIGN PATENT DOCUMENTS

WO WO01/60875 A1 8/2001

OTHER PUBLICATIONS

Burkhardt Compression AG: Certification of Suitability of Total Orites DS 270X for use in ethylene hypercompressors, dated May 30, 2008.*
PCT International Search Report & Written Opinion mailed Dec. 14, 2012, for PCT/EP2012/071644.
(Continued)

*Primary Examiner* — Fred M Teskin

(57) ABSTRACT

Process for polymerizing or copolymerizing ethylenically unsaturated monomers in the presence of free-radical polymerization initiators at pressures in the range of from 110 MPa to 500 MPa and temperatures in the range of from 100° C. to 350° C. in a continuously operated polymerization apparatus, wherein the reaction gas composition is compressed to the polymerization pressure by at least two sequentially operating compressors in which a low-pressure compressor first compresses the reaction gas composition to a pressure of from 10 MPa to 50 MPa and a high-pressure compressor then further compresses the reaction gas composition to the polymerization pressure wherein the high-pressure compressor is operated with a polyalkylene glycol based synthetic lubricant and oxygen is introduced into the fresh gas feed or into the polymerization apparatus in an amount that the gas composition to be compressed in the high-pressure compressor has an oxygen content in the range of from 0.01 ppm to 0.9 ppm.

13 Claims, 1 Drawing Sheet

(51) Int. Cl.
*C08F 4/04* (2006.01)
*C08F 4/34* (2006.01)
*C08F 10/02* (2006.01)
*C08F 10/00* (2006.01)
*C08F 2/38* (2006.01)

(56) References Cited

U.S. PATENT DOCUMENTS

| | | | |
|---|---|---|---|
| 5,059,662 A * | 10/1991 | Wikelski et al. | 526/208 |
| 5,756,606 A | 5/1998 | Wong | |
| 7,582,709 B2 * | 9/2009 | Goossens et al. | 526/64 |
| 2003/0008982 A1 * | 1/2003 | Mahling et al. | 526/82 |

OTHER PUBLICATIONS

A.I. Dintses, A.V. Druzhinina, Synthetic Lubricant Oils, M. Gostoptechizdat, 1958, 18 pages.

Russian Office Action received Jul. 1, 2015 for corresponding Russian Application No. 2014119884, 8 pages.

Unknown, "Orites DS 270", Total Lubrifiants Industrie & Specialites, Jun. 16, 2008 (1 page).†

Unknown, "Standard Guide for Analysis of Ethylene Product", copyright ASTM International, PA, 1997, (2 pages).†

Unknown, "Sales Specification, Product: Liquid Ethylene", Eastman, TX, Mar. 5, 2007 (1 page).†

\* cited by examiner
† cited by third party

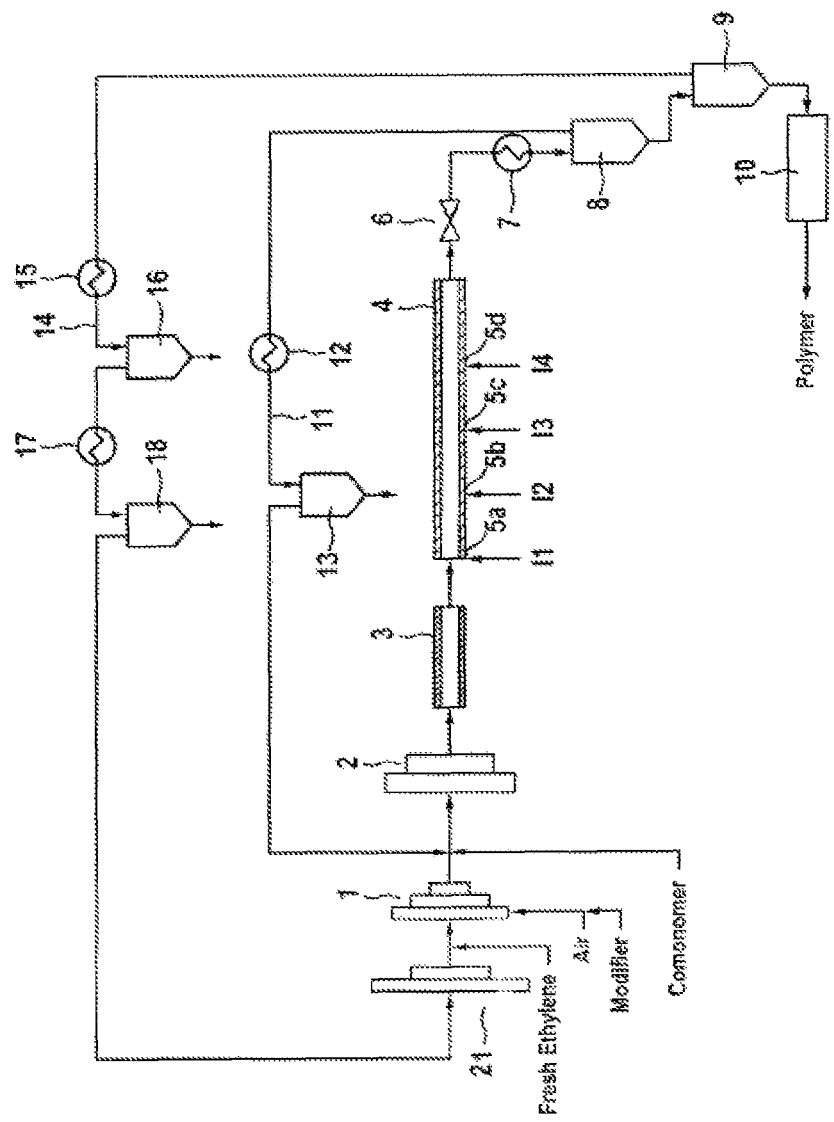

PROCESS FOR POLYMERIZING OR COPOLYMERIZING ETHYLENICALLY UNSATURATED MONOMERS IN THE PRESENCE OF FREE-RADICAL POLYMERIZATION INITIATORS

FIELD OF THE INVENTION

The present invention relates to a process for polymerizing or copolymerizing ethylenically unsaturated monomers in the presence of free-radical polymerization initiators at pressures in the range of from 110 MPa to 500 MPa and temperatures in the range of from 100° C. to 350° C. in a continuously operated polymerization apparatus and to a process for operating a compressor for pressurizing ethylenically unsaturated monomers to a pressure of from 5 MPa to 500 MPa.

BACKGROUND OF THE INVENTION

Polyethylene is the most widely used commercial polymer. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE). LDPE is a versatile polymer which can be used in a variety of applications, such as film, coating, molding, and wire and cable insulation. There is consequently still demand for optimizing the processes for its preparation.

A normal set-up of a plant for polymerizing or copolymerizing ethylenically unsaturated monomers such as ethylene in the presence of free-radical polymerization initiators consists essentially of a set of two compressors, a low-pressure and a high-pressure compressor, a polymerization reactor, which can be an autoclave or a tubular reactor or a combination of such reactors, and two separators for separating the monomer-polymer mixture leaving the tubular reactor, wherein in the first separator, the high-pressure separator, the ethylene separated from the monomer-polymer mixture is recycled to the ethylene-feed between the low-pressure compressor and the high-pressure compressor, and the ethylene separated from the mixture in the second separator, the low-pressure separator, is fed to the low-pressure compressor where it is compressed to the pressure of the fresh ethylene feed, combined with the fresh ethylene feed and the combined streams are further pressurized to the pressure of the high-pressure gas recycle stream. Such a high-pressure polymerization unit normally further includes apparatuses like extruders and granulators for pelletizing the obtained polymer. Monomer supply to the tubular reactor can either be carried out solely in the beginning of the reactor or only partly in the beginning with the other part fed via one or more side feed entries. Moreover, it is also common to introduce initiator in more than one place down the tube, thus creating more than one reaction zone.

The free-radical initiated polymerization of ethylene and optionally additional one or more comonomers is carried out at high pressures, which can reach even 500 MPa. Such high pressures require special technology for the process to be handled in a safe and reliable manner.

The compressors used for pressurizing ethylene and the other components of the reaction mixture are usually reciprocating piston compressors operating with plungers which are lubricated with oils. A recent development was to use as lubricant polyalkylene glycol (PAG) based oils instead of mineral oils. PAG based oils have the advantage that their solubility in supercritical ethylene is lower than the solubility of mineral oils. Therefore the lubrication films are more stable and less oil is transported to the polymer product and accordingly less oil is needed for the lubrication. More stable oil films also improve the lubrication and thereby increase the operating lifetime of the compressor. Moreover, at high pressures, PAG based oils have lower viscosities than mineral oils and can therefore more easily be pumped to the lubrication points.

The reliability of the high-pressure compressors is greatly reduced by polymer deposits in the compressors due to premature polymerization, i.e. polymerization prior to the feed of the free-radical polymerization initiators. In case of commonly used two-stage high-pressure compressors, these polymer deposits block filters on the suction side of the second compression stage as well as suction and discharge valves, resulting in increased pressures and temperatures between the two compression stages and causing strong vibrations on the cylinders of the second compression stage. However, such vibrations and increased interstage pressures can damage the compressor. Consequently, if such polymer deposits are formed it is necessary to remove them frequently. This requires however a shut-down of the plant accompanied by loss of production. Moreover, it had turned out that high-pressure compressors operated with PAG based oils are much more susceptible to formation of polymer deposits than high-pressure compressors operated with mineral oils.

As a consequence, there is a desire to avoid compressor fouling. One possibility is adding an inhibitor to the oil. Disadvantage is that the stabilizer in the oil will not be distributed homogeneously in the gas or supercritical phase thereby limiting its efficiency.

Another possibility is feeding inhibitor to the gas to be compressed. EP 811 590 A1 describes a process for compressing ethylenically unsaturated monomers which comprises carrying out compression in the presence of a sterically hindered amine derivative. EP 1 013 678 A2 discloses a similar process in which the pressurizing is effected in the presence of specific nitroxyl compounds. Additives such as nitrogen containing inhibitors can however remain in the polymer which is not desired as they can, for example, cause organoleptic issues. Furthermore, there is in general an increased demand in the market for "pure" LDPE.

WO 01/60875 refers to a method for polymerizing or copolymerizing ethylenically unsaturated monomers in the presence of radically decomposing polymerization initiators in a continuously operating polymerization device while preventing undesired polymer deposits in the compressors. The method is characterized in that nitrogen monoxide or oxygen is added in a dosed manner as an inhibitor into the high-pressure circuit, into the low-pressure circuit and/or into the pre-compressor. Oxygen can be used as inhibitor since it has generally an inhibiting effect at temperatures below 170° C. and an initiating effect only above 170° C. The document exemplifies oxygen concentrations of 3 ppm and 6 ppm and teaches that oxygen concentrations of from 1 to 5 ppm can be sufficient; the oxygen concentration is preferably 2 to 5 ppm. However, the disadvantage of using oxygen in such concentrations is that there is still an influence of the oxygen on the temperature profile in the tubular reactors. The more oxygen is fed the more rounded the first peak in the temperature profile gets and the less pronounced the temperature drop thereafter is. The success of peroxide initiated reactors is however at least partly due to the fact, that the steep temperature gradients allow for shorter reactors and therefore less investment costs. Oxygen initiated reactors show smaller temperature gradients with less sharp peaks. Therefore increasing the oxygen concentration partly cancels the advantages of peroxide initiation. Especially for high density grades which are run at low maximum temperature, a rounded temperature profile leads to too high temperatures at the beginning of the succeeding reaction zone, thereby limiting as well the range of obtainable product grades as also the achievable production rates.

Thus, it was the object of the present invention to overcome the disadvantages of such processes for polymerizing or copolymerizing ethylenically unsaturated monomers in the presence of free-radical polymerization initiators and provide a possibility for avoiding premature polymerization in the compressors and thereby allowing a higher throughput of the compressors and reducing the risk of compressor damages by reducing compressor vibrations while simultaneously detrimental effects on the flexibility with respect to the range of obtainable product grades and on achievable production rates are minimized

SUMMARY OF THE INVENTION

We found that this object is achieved by a process for polymerizing or copolymerizing ethylenically unsaturated monomers in the presence of free-radical polymerization initiators at pressures in the range of from 110 MPa to 500 MPa and temperatures in the range of from 100° C. to 350° C. in a continuously operated polymerization apparatus, wherein the reaction gas composition is compressed to the polymerization pressure by at least two sequentially operating compressors in which a low-pressure compressor first compresses the reaction gas composition to a pressure of from 10 MPa to 50 MPa and a high-pressure compressor then further compresses the reaction gas composition to the polymerization pressure wherein the high-pressure compressor is operated with a polyalkylene glycol based synthetic lubricant and oxygen is introduced into the fresh gas feed or into the polymerization apparatus in an amount that the gas composition to be compressed in the high-pressure compressor has an oxygen content in the range of from 0.01 ppm to 0.9 ppm.

Furthermore, we have found a process for operating a compressor for pressurizing ethylenically unsaturated monomers to a pressure of from 5 MPa to 500 MPa in which the compressor is lubricated with a polyalkylene glycol based synthetic lubricant and the gas composition to be pressurized has an oxygen content in the range of from 0.01 ppm to 0.9 ppm.

BRIEF DESCRIPTION OF THE DRAWINGS

The features and advantages of the present invention can be better understood via the following description and the accompanying the figure which shows schematically the set-up of a polymerization apparatus with a tubular reactor which can be used in the process of the present invention.

DETAILED DESCRIPTION OF THE INVENTION

The process of the invention can be used both for the homopolymerization of ethylene and for the copolymerization of ethylene with one or more other monomers, provided that these monomers are free-radically copolymerizable with ethylene under high pressure. Examples of suitable copolymerizable monomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, particularly preferably vinyl acetate, can be used as comonomers. Propene, 1-hexene, acrylic acid, n-butyl acrylate, tert-butyl acrylate, 2-ethylhexyl acrylate, vinyl acetate or vinyl propionate are particularly advantageously used as comonomer.

In the case of copolymerization, the proportion of comonomer or comonomers in the reaction mixture is from 1 to 45% by weight, preferably from 3 to 30% by weight, based on the amount of monomers, i.e. the sum of ethylene and other monomers. Depending on the type of comonomer, it can be preferred to feed the comonomers at a plurality of different points to the reactor.

For the purposes of the present invention, polymers are all substances which are made up of at least two monomer units. They are preferably LDPE polymers having an average molecular weight $M_n$ of more than 20 000 g/mole. However, the method of the invention can also be advantageously employed in the preparation of oligomers, waxes and polymers having a molecular weight $M_n$ of less than 20 000 g/mole.

Possible initiators for starting the free-radical polymerization in the respective reaction zones are in general all substances that can produce radical species under the conditions in the polymerization reactor. Examples for such free-radical polymerization initiators are organic peroxides or azo compounds which both represent a preferred embodiment of the process of the present invention. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butyl-peroxy) cyclohexane, tert-butyl peroxyacetate, cumyl peroxyneodecanoate, tert-amyl peroxy-neodecanoate, tert-amyl peroxypivalate, tert-butyl peroxyneodecanoate, tert-butyl permaleate, tert-butyl peroxypivalate, tert-butyl peroxy-isononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C-C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

In a preferred embodiment of the process of the invention, peroxidic polymerization initiators having a relatively high decomposition temperature are used. Suitable peroxidic polymerization initiators include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using di-tert-butyl peroxide or 3,6,9-triethyl-3,6,9-trimethyl-triperoxocyclononane.

The initiators can be employed individually or as a mixture in concentrations of from 0.1 mol/t to 50 mol/t of polyethylene produced, in particular from 0.2 mol/t to 20 mol/t, in each reaction zone. In a preferred embodiment of the present invention the free-radical polymerization initiator, which is fed to a reaction zone, is a mixture of at least two different azo compounds or organic peroxides. If such initiator mixtures are used it is preferred that these are fed to all reaction zones. There is no limit for the number of different initiators in such a mixture, however preferably the mixtures are composed of from two to six and in particular of four or five different initiators. Particular preference is given to using mixtures of initiators which have different decomposition temperatures.

It is often advantageous to use the initiators in the dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of from 2 to 65% by weight, preferably from 5 to 40% by weight and particularly preferably from 10 to 30% by weight.

In the process of the invention, the molecular weight of the polymers to be prepared can as usual be altered by addition of modifiers which act as chain-transfers agents. Examples of suitable modifiers are hydrogen, aliphatic and olefinic hydrocarbons, e.g. propane, butane, pentane, hexane, cyclohexane, propene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or 1-olefins such as propene or 1-hexene, or aliphatic hydrocarbons such as propane.

The reaction mixture generally comprises polyethylene in an amount in the range of from 0 to 45% by weight, based on the total monomer-polymer mixture, preferably from 0 to 35% by weight.

The process of the invention is carried out at pressures of from 110 MPa to 500 MPa, with pressures of from 160 MPa to 350 MPa being preferred and pressures of from 200 MPa to 330 MPa being particularly preferred. The temperatures are in the range from 100° C. to 350° C., preferably from 120° C. to 340° C. and very particularly preferably from 150° C. to 330° C.

The process of the present invention can be carried out with all types of high-pressure reactors appropriate for high-pressure polymerization. Suitable high-pressure reactors are, for example, tubular reactors or autoclave reactors or combinations of such reactors. Preferably the high-pressure reactors are tubular reactors or autoclave reactors and in particular tubular reactors. Common high-pressure autoclave reactors are stirred reactors and have a length-to-diameter ratio of in the range from 5 to 30, preferably from 10 to 20. Appropriate tubular reactors are basically long, thick-walled pipes, which are usually from about 0.5 km to 4 km, preferably from 0.75 km to 3 km and especially from 1 km to 2.5 km long. The inner diameter of the pipes is usually in the range of from about 30 mm to 120 mm and preferably from 40 mm to 90 mm. Such tubular reactors have preferably a length-to-diameter ratio of greater than 1000, preferably from 10000 to 40000 and especially from 25000 to 35000.

Preferred tubular reactors have at least two reaction zones, preferably from 2 to 6 reaction zones and more preferably from 2 to 5 reaction zones. The number of reaction zones is given by the number of feeding points for the initiator. Such a feeding point can, for example, be an injection point for a solution of azo compounds or organic peroxides. Fresh initiator is added to the reactor, where it decomposes into free radicals and initiates further polymerization. The generated heat of the reaction rises the temperature of the reaction mixture, since more heat is generated than can be removed through the walls of the tubular reactor. The rising temperature increases the rate of decomposition of the free-radical initiators and accelerates polymerization until essentially all free-radical initiator is consumed. Thereafter no further heat is generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows adjusting that value. Normally, the temperature rise is set to be in the range of from 70° C. to 170° C. in the first reaction zone and 50° C. to 130° C. for the subsequent reaction zones depending on the product specifications and the reactor configuration.

The compression of the reaction gas composition to the polymerization pressure according to the present invention is carried by at least two sequentially operating compressors in which a low-pressure compressor first compresses the reaction gas composition to a pressure of from 10 MPa to 50 MPa and a high-pressure compressor then further compresses the reaction gas composition to the polymerization pressure of from 110 MPa to 500 MPa. Preferably the low-pressure compressor and the high-pressure compressor are multistage compressors. It is further possible to separate one or more stages of one or both of these compressors and divide them into separated compressors. However, usually a series of one low-pressure compressor and one high-pressure compressor is used for compressing the reaction gas composition to the polymerization pressure. In such cases, sometimes the whole low-pressure compressor is designated as primary compressor. However, it is also common to designate the one or more first stages of the low-pressure compressor, which compress the recycle gas from the low-pressure separator to the pressure of the fresh ethylene feed, as booster compressor and the one or more further stages as primary compressor although they are all part of one apparatus.

Commonly the polymerization apparatus comprises, beside the polymerization reactor, a high-pressure gas recycle line for recycling gas separated in a high-pressure separator from the reaction mixture and a low-pressure gas recycle line for recycling gas separated in a low-pressure separator from the reaction mixture. The gas recycled in the high-pressure gas recycle line is then fed to the high-pressure compressor and the gas recycled in the low-pressure gas recycle line is fed to the low-pressure compressor, preferably to the foremost of one or more first stages of the low-pressure compressor where these one or more first stages of the low-pressure compressor are commonly designated as booster compressor. Preferably, the recycled gas coming from the low-pressure gas recycle line is compressed by the booster compressor to the pressure of the fresh feed of ethylenically unsaturated monomers, preferably ethylene, thereafter combined with the fresh gas feed and the combined gases are further compressed in one or more further stages of the low-pressure compressor, which are commonly designated as the primary compressor, to the pressure of from 10 MPa to 50 MPa. Preferably, the low-pressure compressor, i.e. the combination of booster compressor and primary compressor, comprises five compression stages, two in the booster compressor before adding the fresh gas and three in the primary compressor after adding the fresh gas.

Preferably the high-pressure compressor, which is often also designated as hyper compressor, has two stages; a first stage, which compresses the gas from about 30 MPa to about 120 MPa, and a second stage, which further compresses the gas from about 120 MPa to the final polymerization pressure. In between the two stages, the heat of compression is removed by a heat exchanger, usually designated as interstage cooler. Furthermore, usually the high-pressure compressor is equipped with filters to avoid that waxes as well as polymer and solid particles enter the next compression stage at the suction side. For operating the high-pressure compressor not all parameters can be chosen arbitrarily but some design criteria of the have to be met, such as for example a maximum temperature and a maximum pressure between the two compression stages. As a practical rule, the interstage temperature should stay below 130° C.

A recent development in the art was to operate the compressors in a high-pressure process for the preparation of ethylene homopolymers or copolymers with polyalkylene glycol (PAG) based oils as lubricant instead of using mineral oils. PAG based oils have the advantage that less oil is transported to the polymer product and accordingly on the one hand less oil is needed for lubrication and on the other the produced product is purer compared to using mineral oils. Moreover, PAG based oils are easier to pump to the lubrication points and have a better lubrication effect. However, the tendency toward the formation of polymer deposits in the high-pressure compressor because of premature polymerization when compressing ethylenically unsaturated monomers is increased compared to using mineral oils.

Polymer deposits on filters on the suction side of the second compression stage of the high-pressure compressor cause an increase in the interstage pressures. Furthermore, polymer deposits in the interstage cooler can reduce the heat removed therein, leading to higher temperatures at the suction side of the second stage and consequently also increased interstage pressures. Moreover, polymer deposits can further cause malfunctioning of valves of the second compression stage which may also lead to high interstage pressures. However, to prevent damage from the high-pressure compressor too high interstage pressures have to be avoided. This can be achieved by decreasing the suction pressure of the first compression stage of the high-pressure compressor. Thereby the throughput of the high-pressure compressors is reduced and with it the production rate of the whole polymerization unit. Furthermore, polymer deposits can lead to malfunctioning of valves in the high-pressure compressor which might cause strong vibrations on the cylinders, especially on the cylinders of the second compression stage of the high-pressure compressor. Strong vibrations may however damage the compressor.

According to the process of the present invention oxygen is introduced into the polymerization system in an amount that the gas composition to be compressed in the high-pressure compressor has an oxygen content in the range of from 0.01 ppm to 0.9 ppm, preferably in the range of from 0.05 ppm to 0.5 ppm and more preferably in the range of from 0.1 ppm to 0.4 ppm. The oxygen can be fed as pure oxygen or in form of air. Preferably air is dosed to the polymerization system. The oxygen can be introduced at any point of the polymerization system except the polymerization reactor or the region behind the high-pressure compressor and before the polymerization reactor because then the oxygen acts as initiator in the polymerization and is consumed before reaching the high-pressure compressor. For feeding the oxygen, it is for example possible to introduce it into the fresh gas feed or into the polymerization apparatus after the polymerization reactor, e.g. to feed it to one or more points at the low-pressure gas recycle line, at the high-pressure gas recycle line or the low-pressure compressor. Preferably the oxygen is fed to the low-pressure compressor and in particular to the primary compressor, especially to the suction side of the first compression stage of the primary compressor at a pressure level of about 1.7 MPa. This way the dosing can be accomplished using a pressurized bottle via a reduction valve. Preferably the oxygen or air feed is monitored by a flow meter.

The oxygen content of the gas composition to be compressed in the high-pressure compressor is determined by the oxygen content of the fresh gas feed, the oxygen content of the recycle gas returned to the compressor and the oxygen amount fed into the fresh gas feed or the polymerization apparatus. The reaction gas leaving the polymerization reactor is usually oxygen-free since the low amounts of oxygen entering the polymerization reactor with the compressed gas composition are consumed during polymerization. The oxygen content of the fresh ethylene gas is preferably monitored by a gas analyzer with low detection limit. Suitable gas analyzers are for example micro-fuel cell based gas analyzers with a detection range of 0-10 ppm and an accuracy of ±1% of the upper scale.

The figure shows a typical set-up for a suitable polymerization apparatus with a tubular reactor without however restricting the invention to the embodiments described therein.

The fresh ethylene, which is usually under a pressure of 7 MPa, is added to the polymerization system upstream of a primary compressor (1), by which it is compressed together with recycle gas to a pressure of about 30 MPa. Thereafter the gas mixture is compressed to the polymerization pressure of about 300 MPa using a high pressure compressor (2). Oxygen, preferably as air, and usually a molecular weight regulator (modifier) are added to primary compressor (1). The reaction mixture leaving the high-pressure compressor (2) is fed to pre-heater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). It is usually from about 0.5 km to 4 km, preferably from 1.5 km to 3 km and especially from 2 km to 2.5 km long. The inner diameter of the pipe is usually in the range of from about 30 mm to 120 mm and preferably from 60 mm to 90 mm.

The tubular reactor (4) shown in the figure has four spatially separated initiator injection points (5a) to (5d) for feeding initiators or initiator mixtures I1 to I4 to the reactor and accordingly also four reaction zones. By feeding suitable free-radical initiators, which decompose at the temperature of the reaction mixture, to the tubular reactor the polymerization reaction starts. The generated heat of the reaction rises the temperature of the reaction mixture, since more heat is generated than can be removed through the walls of the tubular reactor.

The amount and nature of added free-radical initiators determines how much the temperature rises and accordingly allows adjusting that value. Normally, the temperature rise in the first reaction zone is set to be in the range of from 70° C. to 170° C. and 50° C. to 130° C. for the subsequent reaction zones depending on the product specifications and reactor configuration. The reaction mixture leaves the tubular reactor (4) through a high-pressure let-down valve (6) and passes a post reactor cooler (7). Thereafter, the resulting polymer is separated off from unreacted ethylene and other low molecular weight compounds (monomers, oligomers, polymers, additives, solvent, etc) by means of a high-pressure separator (8) and a low-pressure separator (9), discharged and pelletized via an extruder and granulator (10).

The ethylene which has been separated off in the high-pressure separator (8) is fed back to the inlet end of the tube reactor (4) in the high-pressure circuit (11) at 30 MPa. It is first freed from other constituents in at least one purification stage and then added to the monomer stream between primary compressor (1) and high pressure compressor (2). The figure shows one purification stage consisting of a heat exchanger (12) and a separator (13). It is however also possible to use a plurality of purification stages. The high-pressure circuit (11) usually separates waxes.

The ethylene which has been separated off in the low-pressure separator (9), which further comprises, inter alia, the major part of the low molecular weight products of the polymerization (oligomers) and the solvent, is worked up in the low-pressure circuit (14) at a pressure of from about 0.1 to 0.4 MPa in a plurality of separators with a heat exchanger being located between each of the separators and then fed to a booster compressor (21), in which it is compressed to a pressure of about 1.7 MPa and then conveyed to primary compressor (1). Booster compressor (21) and primary compressor (1) are preferably part of one low-pressure compressor, i.e. of one apparatus powered by one motor. The figure shows two purification stages consisting of heat exchangers (15) and (17) and separators (16) and (18). It is however also possible to use only one purification stage or preferably more than two purification stages. The low-pressure circuit (14) usually separates oil and waxes.

Different configurations for suitable polymerization apparatuses are of course also possible.

A further embodiment of the present invention is a process for operating a compressor for pressurizing ethylenically unsaturated monomers, preferably ethylene, to a pressure of from 5 MPa to 500 MPa in which the compressor is lubricated with a polyalkylene glycol based synthetic lubricant and the gas composition to be pressurized has an oxygen content in the range of from 0.01 ppm to 0.9 ppm, preferably in the range of from 0.05 ppm to 0.5 ppm and more preferably in the range of from 0.1 ppm to 0.4 ppm. Such a process for operating a compressor can not only be part of a process for preparing polyethylenes at high pressures but also for conveying ethylene in pipelines or pressurizing a gas for storage purposes. Polymer deposits are frequently found in ethylene pipelines requiring using filters for separating the polymer particles from the gas stream. For compressing ethylene for transportation in pipelines reciprocating compressors are commonly used. Furthermore, ethylene is pressurized for a variety of processes such as the synthesis of ethylene oxide or catalytic polymerizations, for example the production of linear low-density and high-density polyethylene as well as for the use of ethylene as comonomer in polymerizations of propylene.

The invention is illustrated below with the aid of examples, without being restricted thereto.

EXAMPLES

The melt flow rate MFR was determined according to DIN EN ISO 1133:2005, condition D at a temperature of 190° C. under a load of 2.16 kg.

Density was determined according to DIN EN ISO 1183-1:2004, Method A (Immersion) with compression molded plaques of 2 mm thickness. The compression molded plaques were prepared with a defined thermal history: Pressed at 180° C., 20MPa for 8 min with subsequent crystallization in boiling water for 30 min.

The oxygen content of the fresh ethylene gas was monitored by a micro-fuel cell based Process Trace Oxygen Analyzer of Teledyne Analytical Instruments, City of Industry, Calif., USA with a detection range of 0-10 ppm and an accuracy of ±1% of the upper scale, i.e. ±0.1 ppm.

Comparative Example A

A high-pressure polymerization of ethylene was carried out in a high-pressure tubular reactor of the design shown in the figure with four initiator injection points having in total a length of 2100 m and a diameter of 76 mm. A solution of a mixture of different peroxides was fed at all four initiator injection points. Propionic aldehyde was used as molecular weight regulator in a range of from 1 to 1.3 kg per ton of produced polyethylene. It was added to the fresh ethylene stream entering between the booster compressor (21) and the primary compressor (1). No oxygen was fed to the reactor set-up, neither to a reaction zone nor to an ethylene recycle line or an compressor. The fresh ethylene had an oxygen content below the detection limit of the analyzer.

The two-stage high-pressure compressor (2) was lubricated with a PAG based oil (ORITES DS 270, Total). The suction pressure of the first stage of the high-pressure compressor was 22.5 MPa and the discharge pressure was 130 MPa. The polymerization pressure was 278 MPa. The high-pressure compressor vibrated heavily. Accelerations larger than 1000 m/s$^2$ were measured on cylinders of the second compression stage by acceleration sensors attached to the surface of the cylinders.

Example 1

The polymerization of Comparative Example A was continued, however air was dosed to the suction side of the first stage of the primary compressor (1) in an amount that the oxygen content of the reaction gas composition fed from the primary compressor (1) to the high-pressure compressor (2) was 0.17 ppm. Within a few hours a reduction of the discharge pressure of the first stage of the high-pressure compressor could be observed. Accordingly, it was possible to increase the suction pressure of the first stage of the high-pressure compressor without exceeding a limiting pressure between the first and the second stage of the high-pressure compressor (2). Stable conditions were reached after 40 hours resulting in a suction pressure of the first stage of the high-pressure compressor of 25.2 MPa and a discharge pressure of 111 MPa. The polymerization pressure was 278 MPa. The vibrations of the high-pressure compressor were strongly reduced. The measured accelerations on cylinders of the second compression stage of the high-pressure compressor were below 100 m/s$^2$.

Comparative Example B

The polymerization was carried out as in Comparative Example A, however propionic aldehyde consumption was increased to a range of from 1.3 to 1.7 kg per ton of polyethylene to produce a different polyethylene grade. The suction pressure of the first stage of the high-pressure compressor was 24.7 MPa and the discharge pressure was 129 MPa. The polymerization pressure was 272 MPa. The high-pressure compressor vibrated heavily with accelerations on cylinders of the second compression stage of the high-pressure compressor larger than 1000 m/s².

The produced polyethylene had a MFR at a temperature of 190° C. under a load of 2.16 kg of 0.86 g/10 min and a density of 0.9242 g/cm3 obtained with a rate of 35.9 t/h.

Example 2

The polymerization was carried out as in Comparative Example B, however air was dosed to the suction side of the first stage of the primary compressor (1) in an amount that the oxygen content of the reaction gas composition fed from the primary compressor (1) to high-pressure compressor (2) was 0.10 ppm. As a consequence the discharge pressure of the first stage of the high-pressure compressor was lower than in Comparative Example B and it was possible to increase the suction pressure of the first stage of the high-pressure compressor. Thus, the polymerization was carried out with a suction pressure of the first stage of the high-pressure compressor of 27.9 MPa and a discharge pressure of 118 MPa. The polymerization pressure was 272 MPa. The vibrations of the high-pressure compressor were strongly reduced. The measured accelerations on the cylinders of the second compression stage of the high-pressure compressor were below 100 m/s².

The produced polyethylene had a MFR at a temperature of 190° C. under a load of 2.16 kg of 0.86 g/10 min and a density of 0.9239 g/cm³ obtained with a rate of 37.3 t/h. Accordingly, it was possible to increase the production rate by 3.9% with respect to Comparative Example B.

Comparative Example C

A high-pressure polymerization of ethylene was carried out in a high-pressure tubular reactor of the design shown in the figure with three initiator injection points having in total a length of 1000 m and a diameter of 39 mm. A solution of a mixture of different peroxides was fed at all three initiator injection points. Propionic aldehyde was used as molecular weight regulator in a range of 1.5 to 2 kg per ton of produced polyethylene. It was added to the fresh ethylene stream entering between the booster compressor (21) and the primary compressor (1). No oxygen was fed to the reactor set-up, neither to a reaction zone nor to an ethylene recycle line or an compressor. The ethylene fed to the high-pressure compressor had an oxygen content of below the detection limit of the analyzer.

The two-stage high-pressure compressor (2) was lubricated with a mineral oil (Corena E 150, Shell). The suction pressure of the first stage of the high-pressure compressor was 23.2 MPa and the discharge pressure was 140 MPa. The polymerization pressure was 275 MPa.

The produced polyethylene had a MFR at a temperature of 190° C. under a load of 2.16 kg of 0.34 g/10 min and a density of 0.9261 g/cm3 obtained with a rate of 7.0 t/h.

Comparative Example D

The polymerization of Comparative Example C was repeated, however air was dosed to the suction side of the first stage of the primary compressor (1) in an amount that the oxygen content of the reaction mixture fed from the primary compressor (1) to high-pressure compressor (2) was 0.4 ppm. No change of the discharge pressure of the first stage of the high-pressure compressor could be observed. Thus, the polymerization was carried out with a suction pressure of the first stage of the high-pressure compressor of 22.8 MPa and a discharge pressure of 139 MPa. The polymerization pressure was 279 MPa.

The produced polyethylene had a MFR at a temperature of 190° C. under a load of 2.16 kg of 0.28 g/10 min and a density of 0.9263 g/cm3 obtained with a rate of 6.9 t/h. That means, a slight reduction of the production rate with respect to Comparative Example C occurred.

What is claimed is:

1. A process for polymerizing or copolymerizing ethylenically unsaturated monomers in the presence of free-radical polymerization initiators at pressures in the range of from 110 MPa to 500 MPa and temperatures in the range of from 100° C. to 350° C. in a continuously operated polymerization apparatus, wherein the reaction gas composition is compressed to the polymerization pressure by at least two sequentially operating compressors in which a low-pressure compressor first compresses the reaction gas composition to a pressure of from 10 MPa to 50 MPa and a high-pressure compressor then further compresses the reaction gas composition to the polymerization pressure wherein the high-pressure compressor is operated with a polyalkylene glycol based synthetic lubricant and oxygen is introduced into the process in an amount such that the gas composition to be compressed in the high-pressure compressor has an oxygen content in the range of from 0.01 ppm to 0.9 ppm.

2. A process according to claim 1, wherein all compressors are operated with a polyalkylene glycol based synthetic lubricant.

3. A process according to claim 1, wherein the low-pressure compressor and the high-pressure compressor are multistage compressors.

4. A process according to claim 1, wherein the polymerization apparatus comprises a polymerization reactor, a high-pressure gas recycle line for recycling gas separated in a high-pressure separator from the reaction mixture and a low-pressure gas recycle line for recycling gas separated in a low-pressure separator from the reaction mixture and the gas recycled in the high-pressure gas recycle line is fed to the high-pressure compressor and the gas recycled in the low-pressure gas recycle line is fed to the low-pressure compressor.

5. A process according to claim 4, wherein the low-pressure compressor is a multistage compressor and the pressure of the recycled gas fed from the low-pressure gas recycle line to the low-pressure compressor is lower than the pressure of a fresh gas feed of ethylenically unsaturated monomers and the recycled gas coming from the low-pressure gas recycle line is fed to the foremost of one or more first stages of the low-pressure compressors, which compress it to the pressure of the fresh feed of ethylenically unsaturated monomers, thereafter combined with the fresh feed of ethylenically unsaturated monomers and further compressed by one or more further stages of the low-pressure compressors to the pressure of from 10 MPa to 50 MPa.

6. A process according to claim 1, wherein the polymerization apparatus comprises a tubular polymerization reactor or an autoclave as polymerization reactor.

7. A process according to claim 1, wherein the free-radical polymerization initiators are organic peroxides or azo compounds or mixtures of such compounds.

8. A process according to claim 1, wherein ethylene is polymerized or copolymerized with one or more other monomers for preparing ethylene homopolymers or ethylene copolymers.

9. A process for operating a compressor for pressurizing ethylenically unsaturated monomers to a pressure of from 5 MPa to 500 MPa in which the compressor is lubricated with a polyalkylene glycol based synthetic lubricant and the gas composition to be pressurized has an oxygen content in the range of from 0.01 ppm to 0.9 ppm.

10. A process according to claim 9, wherein ethylene is pressurized.

11. A process according to claim 1, wherein the oxygen is introduced into the process as pure oxygen or in the form of air.

12. A process according to claim 1, wherein the oxygen is introduced into the process in an amount such that the gas composition to be compressed in the high-pressure compressor has an oxygen content in the range of from 0.1 ppm to 0.4 ppm.

13. A process for polymerizing or copolymerizing ethylenically unsaturated monomers in the presence of free-radical polymerization initiators at pressures in the range of from 110 MPa to 500 MPa and temperatures in the range of from 100° C. to 350° C. in a continuously operated polymerization apparatus, wherein the reaction gas composition is compressed to the polymerization pressure by at least two sequentially operating compressors in which a low-pressure compressor first compresses the reaction gas composition to a pressure of from 10 MPa to 50 MPa and a high-pressure compressor then further compresses the reaction gas composition to the polymerization pressure wherein the high-pressure compressor is operated with a polyalkylene glycol based synthetic lubricant and oxygen is independently introduced into the process in an amount such that the gas composition to be compressed in the high-pressure compressor has an oxygen content in the range of from 0.01 ppm to 0.9 ppm.

* * * * *